Sept. 29, 1959  H. FERCHL ET AL  2,906,139
MECHANISM FOR SHIFTING GEARS IN A GEAR TRANSMISSION
Filed July 23, 1956  3 Sheets-Sheet 1
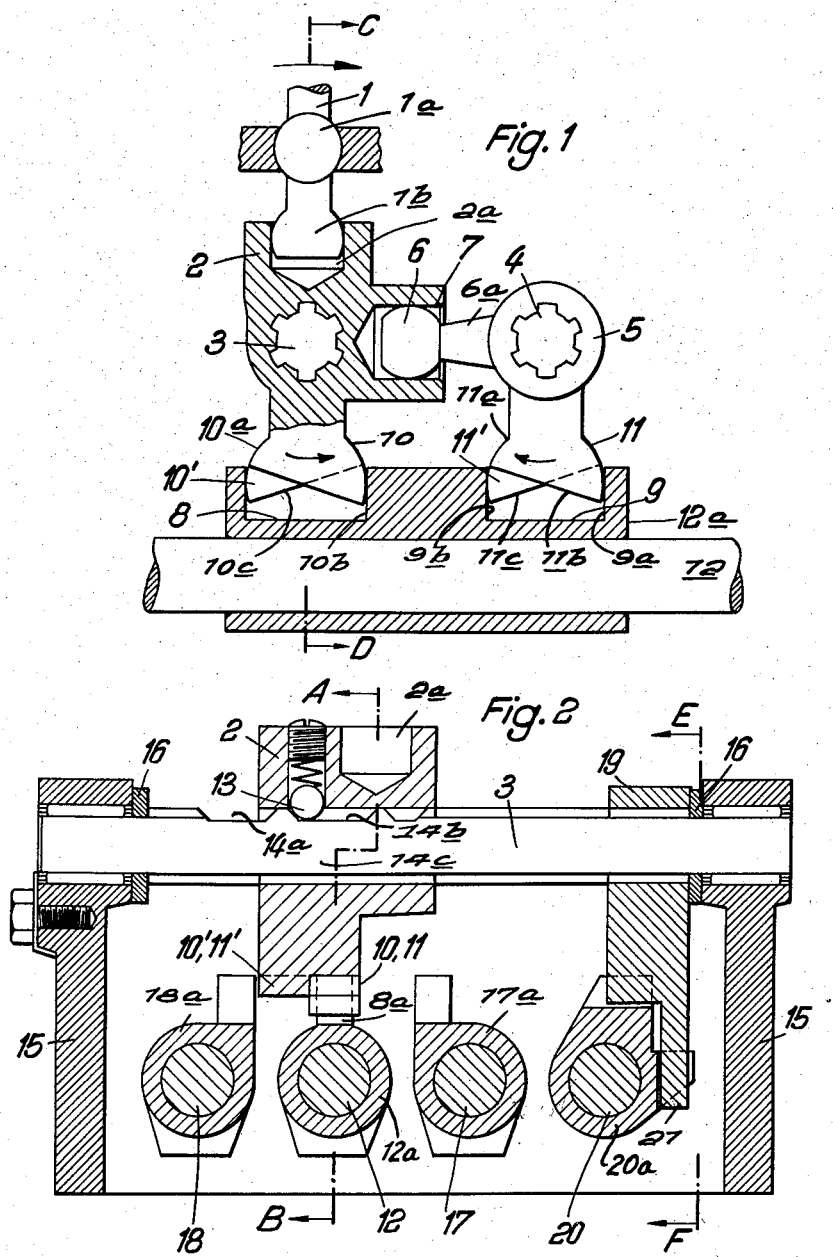
Inventors
HELMUTH FERCHL,
ANTON ZITTRELL,
BY Parry & Shine
ATTORNEY

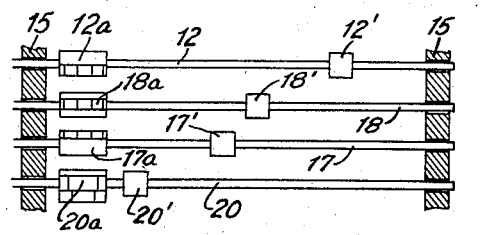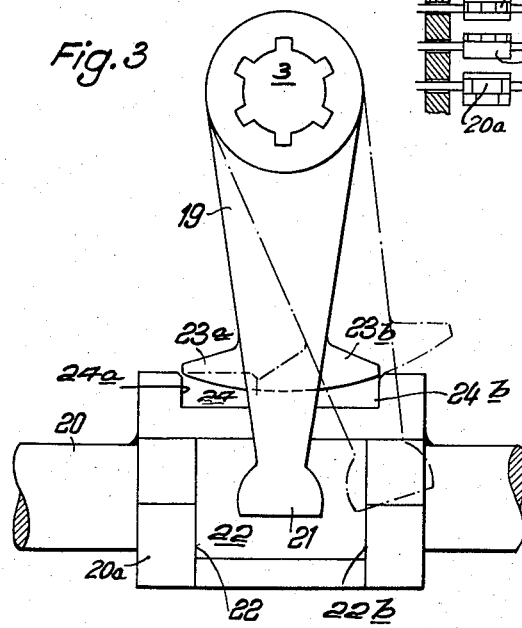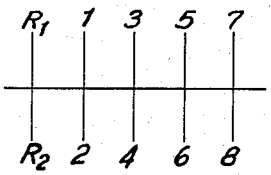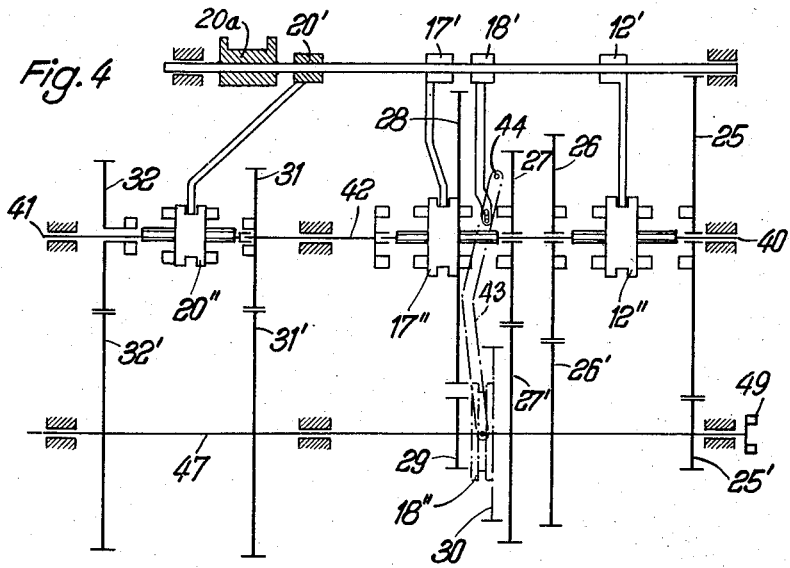

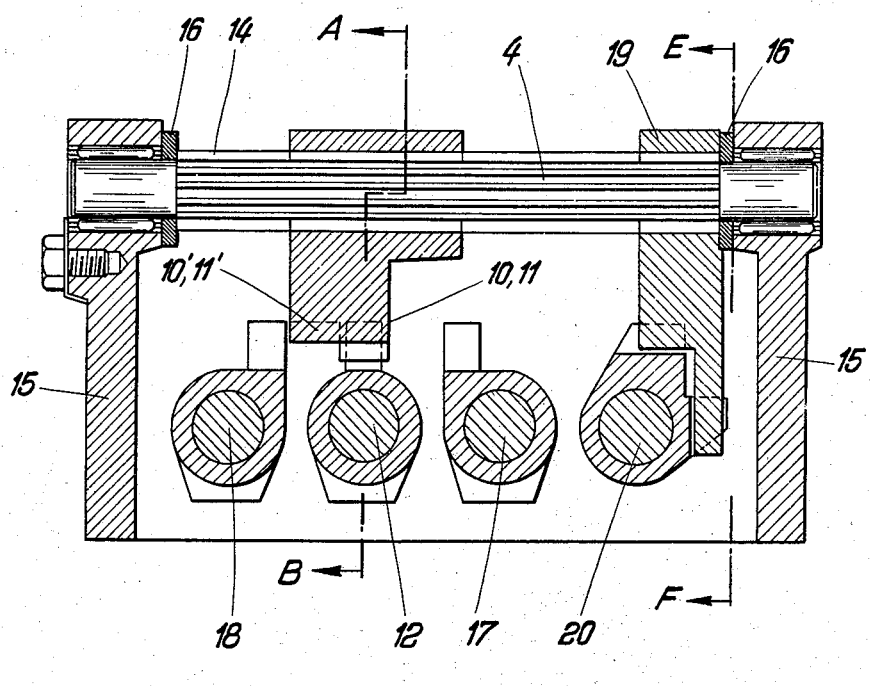

United States Patent Office 2,906,139
Patented Sept. 29, 1959

2,906,139

MECHANISM FOR SHIFTING GEARS IN A GEAR TRANSMISSION

Helmuth Ferchl and Anton Zittrell, Friedrichshafen, Germany, assignors to Zahnradfabrik Friedrichshafen, Friedrichshafen am Bodensee, Germany Application July 23, 1956, Serial No. 599,502

Claims priority, application Germany July 23, 1955

13 Claims. (Cl. 74—473)

This invention relates to gear shift transmissions and more particularly to a mechanism for shifting the rods normally found in that type of transmission.

Reference is made to the application of Zittrel et al., S.N. 703,224, filed December 16, 1957 relating to gear shift mechanisms and assigned to the present assignee.

Among the objects of the invention are to provide a simple, rugged, and economically manufactured mechanism for shifting gear shift rods. A further object of the invention is to provide a mechanism wherein a single, manually operable lever is effective for control of a large number of gears so as to bring about a considerable variation in shift speeds.

In general, our invention comprises, in addition to the usual plurality of parallel shifting rods, a collar on each of said rods which collars are selectively engaged by stub levers manually actuated by means of a single, shifting lever. The stub levers are provided with cam surfaces of a novel nature which co-act with the collars on the rods in such a way as to shift certain rods only in one rotational direction of the manually shiftable lever. By using a pair of stub levers mechanically inter-connected so as to be simultaneously moved by a manually operable lever, a considerable variation in shifting function is effected.

Our invention will now be described in detail in conjunction with the appended drawing in which:

Fig. 1 shows a longitudinal section of a shifting collar on a shifting rod, wherein the collar is actuated by a pair of stub levers which are controlled by a single manually operable lever; the section on which Fig. 1 is taken is shown by the line A—B in Fig. 2.

Fig. 2 is a section on the line C—D of Fig. 1.

Fig. 3 is a magnified section along the line E—F of Fig. 2.

Fig. 4 is a diagram of a multi-speed transmission operable by means of a gear shifting mechanism as described herein.

Fig. 5 illustrates the shifting system.

Fig. 6 illustrates in plan view the layout of the shifting rods and collars.

Fig. 7 is a longitudinal section of an alternate construction.

Referring now to Fig. 1, a manual operating lever 1 is shown engaged with a stub lever 2. Thus the lever 1 may be conventionally mounted by means of a ball joint 1a as shown, the lower end 1b of lever 1 being ball-shaped and being accommodated in a cavity 2a at the upper end of the stub lever 2, in a well understood manner. The lever 2 is slidably splined on a rotatable shaft 3 secured by spacer discs 16. A shaft 4 is provided, parallel to shaft 3, on which shaft a stub lever 5 is slidably splined, and having an end 6 on an integral arm 6a, end 6 protruding into aperture 7 provided in the side of the stub lever 2. Thus, it will be apparent that when the lever 1 is moved in the direction of the arrow, i.e., clockwise, the lever 2 will move counterclockwise, while the lever 5 will move clockwise, viz., in the same direction as lever 1.

The engagement of the end 6 of lever 5 in the socket 7 of lever 2 brings about this relative moving relationship, as will be readily understood from consideration of Fig. 1.

The lower end of the stub lever 2 is provided with a pair of cams 10 and 10′ while the lower end of the stub lever 5 is provided with cams 11 and 11′. By comparing with Fig. 2, it will be seen that the cams 10 and 11 are substantially co-planar and so that cams 10′ and 11′ are also substantially co-planar, the cams control a shifting rod 12 via a collar 12a. The cams fit in respective recesses of a collar 12a. Thus, the recess 8 having walls or abutments 8a and 8b of the collar 12a is shown in Fig. 2 as accommodating selectively the cam 10 or the cam 10′, while the recess 9 is shown as accommodating selectively the cam 11 or the cam 11′.

The cam 10 is transposed 180° relative the cam 10′ while cam 11 is transposed 180° relative cam 11′. Surfaces 10 and 11 form a set for moving rod 12 in one direction and surfaces 10′ and 11′ form a set for movement in the opposite direction. The two cams 10 and 11 are engaged at this time, as will be readily apparent from Fig. 2. It will be noted that the curved surfaces specifically designated by numerals 10 and 11 are positioned in their respective recesses adjacent the right-hand walls or abutments 8a and 9a, respectively, thereof, so that upon clockwise rotation of the handle 1 the collar 12a will be shifted (Fig. 1) toward the right by cam 10. It will likewise be noted that when the lever 1 moves clockwise, the lever 5 moves clockwise as well. Accordingly, the right-hand side of the cam 11 has no thrust on the right-hand wall 9a of the recess 9. The cam surfaces are preferably circular.

The cams are cut with oppositely sloping bottoms such as 10b and 10c, 11b and 11c so that the foreshortened surfaces such as 10a, 11a do not exert thrust on the adjacent recess walls at any time. Thus, surface 11a is disposed outside the recess 9 at this time and cannot engage the left-hand wall 9b, and accordingly, it has no effect as lever 5 rotates clockwise.

Now, if the lever 1 be rotated in a direction opposite to the arrow as shown on Fig. 1, that is in a counter-clockwise direction, the lever 5 follows this same counter-clockwise direction of rotation, in which case cam surface 11 thrusts against the wall 9 to move the collar 12a to the right. At this time the cam 10 is rotating clockwise and the surface of cam 10 exerts no thrust on the wall 8a of recess 8, while the cam portion 10a is outside of the recess 8 entirely, and thus can effect no thrust.

Accordingly, from the above it will be apparent that when cams 10 and 11 are disposed in recesses 8 and 9, respectively, regardless of the direction of rotation of the lever 1, whether clockwise or counter-clockwise, the collar 12a and the shaft 12 to which it is attached can move only to the right.

Since the surfaces of the cams 10′ and 11′ are oppositely disposed to those of 10 and 11 respectively, it will be apparent that the collar 12a may be shifted in a reverse direction, i.e., to the left as viewed in Fig. 1, when the cams 10′ and 11′ are shifted into recesses 8 and 9 respectively, from the position shown in Fig. 2. Thus, shifting of rod 12 to the left is accomplished by the lever 1 regardless of whether the lever 1 is rotated clockwise or counter-clockwise, the action being the same as heretofore described for cams 10 and 11, but the motions being reversed.

The shaft 3 on which the stub lever 2 is slidably splined, is rotatable and mounted in suitable bearings at its end, as shown. The shaft is provided with indentations 14a, b, c as shown in Fig. 2 which co-act with a spring-pressed ball 13 so that the lever 2 may be shifted longitudinally on the shaft and held in any of three selectively shifted positions by virtue of the three indentations shown. Indentations 14a and b are made wide enough so that cams 10, 11 or 10', 11' may be readily brought into recesses 8 and 9 so that motion of rod 12 or a rod 18 may be readily effected in either direction. Inasmuch as the stub lever 5 is mechanically coupled through the integral arm 6a with the lever 2, the lever 5 will be shifted on its respective shaft 4 when lever 2 is shifted. Shifting of lever 2 is, of course, accomplished by motion of the lever 1, which is universally mounted as heretofore stated. Such motion of lever 1 for shifting the levers 2 and 5 is accomplished by rocking lever 1 in or out of the plane of the paper (Fig. 1), as will readily be apparent from consideration of Figs. 1 and 2. From the above it will be understood that the cams 10, 11 or 10', 11' may be brought into engagement with recesses similar to recesses 8 and 9, provided in shifting collars such as 17a and 18a of shifting rods 17 and 18, respectively.

In the representation of Fig. 2 the cam surfaces 10 and 11 are engaged with the shifting rod 12 for the first to the fourth speeds. By moving the levers 2 and 5 into the next position, that is toward the left as viewed on Fig. 2, cams 10' and 11' engage with the shifting rod 18 via the collar 18a for two reverse speeds. The shifting rod 17 controls speeds from the fifth to the eighth.

An additional lever 19 (Fig. 3) is keyed non-slidably to the shaft 3 and engages a shifting rod 20. Lever 19 always rotates in the same direction as lever 2, and is provided with a finger 21 having considerable lateral clearance with the walls or abutments 22a and b of a recess 22 provided in the shifting rod 20. The lever 19 is further provided with a pair of cam elements 23a and b which engaged opposite walls or abutments 24a and 24b, respectively, of a recess 24 provided in shifting rod 20. The engagement of these cams with the respective walls of recess 24 takes place only when the rod 20 is shifting into neutral position.

The shifting rods 12, 17, and 18 are coupled with gear shift collars 12", 17", and 18", as indicated on Fig. 4. Owing to the large lateral clearance between finger 21 and sides of recess 22, when lever 1 is actuated to rotate lever 2 to control any particular gear shift collar 12", 17" and 18", that collar will become effective to control its respective gear quicker than a gear shift collar 20" which is coupled with the shifting rod 20. However, since the clearance between the cams 23 and the respective walls of recess 24 is fairly close, the uncoupling of the gear shift collars 12", 17" and 18" is practically simultaneous with the uncoupling of the gear shift collar 20".

The use of the gear shift mechanism described in conjunction with Figs. 1, 2 and 3, is shown in Fig. 4. For an eight-speed transmission consisting of a four-speed transmission with three pairs of gear wheels 25, 25'; 26, 26'; and 27, 27', two gear shift collars 12' and 17', as heretofore mentioned, which are for the forward speeds, and a further group of gear wheels 28, 29 and 30 with the previously mentioned gear shift collar 18" for the reverse gear collar 12" meshes with the gear wheel 25. By mission group with two pairs of gear wheels, 31, 31'; 32, 32' and the previously mentioned gear shift collar 20". The four gear shift collars are operated by means of four shifting forks 12', 17', 18' and 20'. Of these forks 12', 17' and 20' engage directly with the corresponding collars 12", 17" and 20". The shifting fork 18' acts upon a connecting link 43 which is mounted rotatably at its upper end 44 in the transmission housing.

When lever 1 is rotated in the direction of the arrow as shown on Fig. 1, lever 2 turns in the opposite direction, that is counter-clockwise, and moves the shifting rod 12 along with the shifting fork 12' to the right. Thus, the gear shift collar 12" meshes with the gear wheel 25. By virtue of this action, gear wheel 25 is coupled with a driving shaft 40 of the transmission. The lever 29 rotates in the same direction as the lever 2 and with some delay due to the spacing between the finger 21 and the recess walls of the recess 22, as heretofore explained. Accordingly, the shifting rod 20 and its respective gear shift collar 20" move to the right by virtue of movement of the finger 21. As a result the group of gear wheels 31, 31' is coupled with a primary shaft 41 of the transmission and the first speed is thereby engaged.

The second set-up through the same pair of gear wheels 25, 25' and the group of gears 32, 32' is achieved by means of the gear shift collar 12" being moved again to the right as in the case of first speed. In this instance, however, gear shift collar 20" is moved toward the left. These separate movements are achieved by turning the lever 1 counter-clockwise, that is in a direction opposite to that of the arrow shown in Fig. 1.

Third and fourth gears are brought into play by coupling gear shift collar 12" with gear wheel 26. This is achieved by swinging the lever 1 upwardly of the paper as viewed on Fig. 1. Accordingly, the lever 2 moves toward the right, as viewed on Fig. 2, and in either of the two rotational directions of lever 1 as viewed on Fig. 1, the cam surfaces, 10' and 11', engage the shifting rod 12, moving the rod to the left regardless of direction of rotation of lever 1.

Fifth and sixth gears are effected by moving lever 2 farther toward the right as viewed on Fig. 2. This results in cams 10 and 11 engaging the shifting rod 17 which in either rotational direction of lever 1, as viewed on Fig. 1, is moved toward the right. As a result the gear shift collar 17" engages the gear wheel 27. In this same shifting movement, the lever 19 moves the gear shift collar 20", that is when turning the operator lever 1 in the direction of the arrow, thence to the right (fifth gear) and when turning said lever in the opposite direction of the arrow, thence to the left (sixth gear). When moving the lever 1 into its end position toward the right, the surface of the cams 10' and 11' engage the shifting rod 17. As a result, gear shift collar 17" is moved to the left in each case. Drive shaft 40 is coupled directly with an intermediate shaft 42. Through this same shifting movement in the direction of the arrow, lever 19 is moved in a direction opposite to that of the arrow. As a result, lever 19 shifts the gear collar 20" toward the right as viewed on Fig. 4. This results in a direct coupling with the primary shaft 41 with the intermediate shaft 42, and with the driving shaft 40. In this way the seventh gear is set up through direct coupling of the primary shaft with the driving shaft. By rotating lever 1 opposite the direction of the arrow into the other shifting position, the gear shift collar 17" remains coupled with the intermediate shaft 42. Moreover gear shift collar 20" is brought to mesh with gear wheel 32, through lever 19. Through this action the primary shaft 41 is coupled with the intermediate shaft 42 and with the driving shaft 40 via the pairs of gear wheels 32, 32' and 31, 31'. Thus, the eighth gear is engaged which is the highest speed.

Lever 19 may alternatively be keyed on to shaft 4 as shown on Fig. 7. In such case the movement of the gear shift collar 20" is, with every movement of the operating lever, just the reverse from those shown with the construction of Figs. 1 and 2.

First speed is established by shifting sleeve 12" to the right and sleeve 20" to the left, thus wheel pair 31, 31' being coupled to the input shaft 41. For second speed sleeve 12" is again shifted to the right while sleeve 20" is shifted to the right thus coupling wheel pair 32, 32' to the input shaft 41. Third speed is brought about with sleeve 12" shifted to the left and sleeve 20" to the left, and fourth speed with sleeve 12" to the left and sleeve 20" to the right.

Fifth speed and sixth speed are reached by shifting sleeve 17" to the right each time, while sleeve 20" is shifted to the left and to the right respectively.

For driving in seventh and eighth speeds, sleeve 17'' is shifted both times to the left, while sleeve 20'' is shifted to the left and to the right respectively. Thus, in the eighth (direct) speed, input shaft 41 is coupled directly to intermediate shaft 42, and intermediate shaft 42 is coupled to output shaft 40.

Through simultaneous changing of the number of teeth of the gear wheels 31, 31' and 32, 32' this type of construction is suitable for a transmission that has a gradation of gears peculiar to mountain driving. In such case, the fastest gear is set up through direct coupling of the primary shaft 41 via the gear shift collar 20'', the intermediate-shaft 42, the gear shift collar 17'', with the driving shaft 40. The seventh gear is set up by moving the gear shift collars 20'' and 17'' toward the left. The transition into slow speed is brought about by the pairs of gear wheels 32, 32' and 31, 31', and the shaft 42 and 40.

A shifting system based on the present invention has the advantage over prior shifting systems for multi-speed transmission in that all gears may be shifted by means of a single, manually operative lever precisely as in the case of a single, three-speed transmission.

Fig. 5 shows the shifting system of the transmission intended to be controlled by our invention of a single, manual operator in conjunction with other elements as hereinabove described. The shifting rods and cams are arranged in such an order that consecutive pairs of speeds $R_1$, $R_2$; 1, 2; 3, 4; etc. are located side by side in the shifting system so that consecutive gear speeds are shifted in the conventional manner, that is either by a straight motion or by a Z-type motion of the operating lever.

We claim:

1. A mechanism for shifting gears of a transmission, comprising a plurality of shifting rods each rod being provided with opposed abutment elements defining a space therebetween, cam elements selectively positionable within said spaces and having cam surfaces selectively engageable with said abutment elements, to shift individual rods, said cam elements being coupled for rocking in opposite directions, said cam surfaces being disposed so that a selected rod will move in the same direction regardless of the direction of rocking of said cam elements, said direction being dependent on predetermined selective engagement of said cam surfaces with respective abutment elements.

2. A mechanism as set forth in claim 1, said cam elements each comprising a rockable lever each lever carrying a pair of oppositely disposed cam surfaces spaced in planes parallel to the plane of rocking of respective levers, the pair of cam surfaces of one lever being disposed with respect to those of the other lever so that as said levers are rocked in opposite rotative directions, the thrust of any cam surface engaging an abutment element being in the same linear direction, said levers being bodily translatable to bring the one of each pair of cam surfaces alternatively into engagement with respective abutment elements so as to effect thrust in a selected direction for either rotative direction of rocking of said levers.

3. In a device of the class described, a pair of levers linked for simultaneous rotative motion, a pair of cam elements mounted and coupled for directionally opposite rotation by respective levers, said cam elements each having a respective cam surface for exerting thrust, said cam surfaces being disposed with respect to each other so that one cam surface or the other effects a thrust in the same direction regardless of the direction of rotation of said levers.

4. In a device as set forth in claim 3, each of said cam elements having a second cam surface disposed for exerting a thrust in a direction opposite to that of the first-mentioned cam surface, said cam elements being bodily translatable, a member having abutment elements engageable by said cam surfaces, translation of said cam elements effecting selective positioning of said cam surfaces to selectively engage said abutment elements for moving said member in a selected direction or in the opposite direction.

5. In a device as set forth in claim 4, including a universally mounted manually operable lever engaging one of said aforementioned cam elements to effect rocking thereof when said manually operable lever is rocked in one plane and to effect bodily translation of said cam elements when said manually operable lever is rocked in a plane normal to said last-mentioned plane.

6. In a device of the class described, a pair of cam elements pivotally mounted and mechanically coupled for rocking motion in opposite rotary directions, each cam element having a pair of arcuate cam surfaces rotative in parallel planes about the center of rotation of the respective cam element, said cam surfaces of each pair being geometrically transposed with respect to each other, there being thus one set of cam surfaces comprised of a cam surface of each pair, and another set comprised of the other cam surface of each pair; one set effective to exert thrust in one direction and the other set being effective to exert thrust in the opposite direction.

7. In a device as set forth in claim 6, a plurality of movable members having abutment elements engageable by said sets of cam surfaces and being actuatable by rocking motion of said cam elements in one direction or the other depending on which set of cam surfaces are in engagement with said abutment elements, including means for bodily translating said cam elements to selectively engage either set with one of said movable members.

8. In a device as set forth in claim 7, said cam elements each comprising a stub lever, a respective shaft on which each stub lever is mounted, one of said stub levers being splined to its respective shaft, a third lever keyed to said shaft to move said member, said latter abutment elements engageable by said finger upon rotation of said last mentioned lever effected by rotation of said shaft to move said member, said latter abutment elements being spaced so as to interpose a delay in engagement of said finger with either of said latter abutment elements until after one of said first-mentioned movable members has been actuated.

9. In a device as set forth in claim 7, including a cam means carried by said last-mentioned lever and additional abutment elements on said last mentioned movable member engageable by said cam means to effect return movement of said last mentioned movable member simultaneously with return movement of any of said first-mentioned movable members.

10. In a device as set forth in claim 7, for shifting gears of a transmission having an input shaft, an intermediate shaft, an output shaft and a layshaft, movable shift collars splined to said output shaft and a shift collar splined to said input shaft, said layshaft carrying a power take-off member, said stub levers with said sets of cam surfaces being adapted to be rocked out of engagement from said movable members to effect the driving of layshaft with shaft being at rest.

11. A mechanism for shifting gears of a transmission, comprising a plurality of shifting rods each rod being provided with recesses having opposed walls, cam elements selectively positionable to shift individual rods and having surfaces selectively engageable with said walls of the respective shift rod, said cam elements being coupled for rocking in opposite directions, said cam surfaces being disposed so that a selected rod will move to the same side of a neutral position when said cam elements move to opposite sides of a neutral position.

12. In a device of the class described, a pair of cam elements pivotally mounted and mechanically coupled for rocking motion in opposite rotary directions, each cam element having a pair of arcuate cam surfaces rotative in parallel planes about the center of rotation of the respective cam element, said cam surfaces of each pair being geometrically transposed with respect to each other, there being thus one set of cam surfaces comprised of a cam surface of each pair, and another set comprised of the other cam surface of each pair; one set effective to exert thrust in one direction and the other set being effective to exert thrust in the opposite direction, a plurality of movable members having abutment elements engageable by said sets of cam surfaces and being actuatable by rocking motion of said cam elements in one direction or the other depending on which set of cam surfaces are in engagement with said abutment elements including means for bodily translating said cam elements to selectively engage either set with one of said movable members, said movable members being engaegd to shifting collars via shifting forks, said shifting collars forming parts of clutches.

13. A mechanism for shifting gears of a transmission, comprising a plurality of shifting rods, each rod being provided with spaced abutment elements, cam elements selectively positionable to shift individual rods and having surfaces selectively engageable with said abutment elements of the respective shift rod, said cam elements being coupled for rocking in opposite directions, said cam surfaces being disposed so that a selected rod will move to the same side of a neutral position when said cam elements move to opposite sides of a neutral position.

References Cited in the file of this patent

UNITED STATES PATENTS

| | | |
|---|---|---|
| 2,250,820 | Backus | July 29, 1941 |
| 2,344,096 | Kummich | Mar. 14, 1944 |
| 2,529,741 | Roberts | Nov. 14, 1950 |